(12) United States Patent  (10) Patent No.: US 8,020,674 B2
Miura et al.  (45) Date of Patent: Sep. 20, 2011

(54) DISK BRAKE FOR VEHICLE

(75) Inventors: Yasutaka Miura, Nagano (JP); Kenji Asahi, Nagano (JP); Yoshihiko Hanaki, Saitama (JP)

(73) Assignee: Nissin Kogyo Co., Ltd, Nagano (JP)

( * ) Notice: Subject to any disclaimer, the term of this patent is extended or adjusted under 35 U.S.C. 154(b) by 0 days.

(21) Appl. No.: 12/729,957

(22) Filed: Mar. 23, 2010

(65) Prior Publication Data

US 2010/0243389 A1  Sep. 30, 2010

(30) Foreign Application Priority Data

Mar. 26, 2009  (JP) ................................. 2009-076385

(51) Int. Cl.
*F16D 65/02*  (2006.01)
(52) U.S. Cl. .................................................. 188/73.38
(58) Field of Classification Search .... 188/73.36–73.38, 188/73.46
See application file for complete search history.

(56) References Cited

U.S. PATENT DOCUMENTS

| 4,371,060 | A | * | 2/1983 | Iwata | 188/73.38 |
|---|---|---|---|---|---|
| 5,699,882 | A | * | 12/1997 | Ikegami et al. | 188/73.38 |
| 5,941,348 | A | * | 8/1999 | Matsumoto et al. | 188/73.38 |
| 6,003,642 | A | * | 12/1999 | Mori et al. | 188/73.44 |
| 7,201,257 | B2 | * | 4/2007 | Nakajima et al. | 188/73.38 |
| 7,219,773 | B2 | * | 5/2007 | Ono | 188/73.38 |
| 7,766,131 | B2 | * | 8/2010 | Hayashi | 188/73.37 |
| 2007/0251772 | A1 | * | 11/2007 | Tsurumi | 188/73.38 |

FOREIGN PATENT DOCUMENTS

| JP | 2000-161401 | 6/2000 |
|---|---|---|
| JP | 3934063 | 6/2007 |

* cited by examiner

*Primary Examiner* — Christopher Schwartz
(74) *Attorney, Agent, or Firm* — Andrew M. Calderon; Roberts Mlotkowski Safran & Cole, P.C.

(57) ABSTRACT

A disk brake for a vehicle includes: a caliper bracket; a pair of caliper support arms; pad guide grooves that have outer side surfaces, inner side surfaces and opposed surfaces; and lug pieces that protrude on both side parts of back plates of friction pads supported by the pad guide grooves through a pad retainer, the pad retainer including a pair of retainer parts, a connecting piece and pad resilient parts, wherein: the retainer parts include inner side pieces arranged along the inner side surfaces of the pad guide grooves, outer side pieces arranged along the outer side surfaces of the pad guide grooves and interior pieces that connect the outer side pieces to the inner side pieces; and the outer side pieces include impact suppressing parts that restrain the lug pieces from colliding with the outer side surfaces through the outer side pieces.

20 Claims, 10 Drawing Sheets

DISK BRAKE FOR VEHICLE

BACKGROUND

1. Field of the Invention

The present invention relates to a disk brake for a vehicle used in a motor vehicle or a motor bicycle, and more particularly to a structure of a pad retainer that supports lug pieces of a back plate of a friction pad by pad guide grooves of caliper support arms.

2. Description of the Related Art

In a disk brake in which lug pieces respectively protruding at both side parts of a back plate of a friction pad are supported by pad guide grooves formed and opposed to each other in a pair of caliper support arms so as to move the friction pad in the axial direction of a disk, a pad retailer formed with a metal thin plate is ordinarily interposed between the pad guide grooves and the lug pieces. In such a pad retainer, a pad retainer is known that includes resilient parts abutting on the lug pieces to urge the lug pieces toward sides opposite to a disk rotor and urge the lug pieces toward outer side surfaces of the pad guide grooves in the radial direction of the disk, so that the pull-back and the backlash of the friction pad are suppressed by them (for instance, see Japanese Patent No. 3934063).

Further, as an attaching structure of a pad retainer to caliper support arms, an attaching structure is known that pad retainer attaching parts are provided in outer sides of pad guide grooves in the radial direction of a disk, end parts of outer side pieces of the pad retainer in the radial direction of the disk arranged in the outer side surfaces of the pad guide grooves in the radial direction of the disk are bent along end surfaces of the pad retainer attaching parts and extended to the outer side surfaces of the pad retainer attaching parts in the radial direction of the disk to form attaching pieces and the pad retainer attaching parts are sandwiched between the attaching pieces and the outer side pieces in the radial direction of the disk to attach the pad retainer to the caliper support arms (for instance, see JP-A-2000-161401).

In the structures disclosed in Japanese Patent No. 3934063 or the JP-A-2000-161401, the sliding resistance of the lug pieces of the friction pad can be reduced or the backlash can be suppressed by the pad retainer. In a vibration arising during an ordinary driving of a vehicle, the lug pieces of the friction pad can be held at prescribed positions in a stable way by an urging force of resilient parts of the pad retainer. However, when the vibration larger than an ordinary vibration is applied to a vehicle body, for instance, when the vehicle gets over a stepped part during the driving, occasionally, the friction pad temporarily moves inside in the radial direction of the disk against the urging force of the pad retainer, then, is urged outside in the radial direction of the disk by the urging force of the pad retainer and the surfaces of the lug pieces collide with the outer side surfaces of the pad guide grooves in the radial direction of the disk through the pad retainer to generate cronk noise (collision noise).

SUMMARY

It is an object of the present invention to provide a disk brake for a vehicle that can suppress the backlash of a friction pad by a pad retainer and can prevent the generation of cronk noise.

According an aspect of the invention, there is provided a disk brake for a vehicle including: a caliper bracket fixed to a vehicle body; a pair of caliper support arms provided in the caliper bracket that extend and stride over an outer edge of a disk rotor in the axial direction of a disk; U shaped pad guide grooves that are provided in the caliper support arms in opposed forms and have outer side surfaces in the radial direction of the disk, inner side surfaces in the radial direction of the disk and opposed surfaces which connect together both the side surfaces; and lug pieces that respectively protrude on both side parts of back plates of friction pads arranged with the disk rotor sandwiched between them and are respectively supported by the pad guide grooves through a pad retainer, the pad retainer including a pair of retainer parts attached to the pad guide grooves at both the sides of the disk rotor, a connecting piece that strides over the outer edge of the disk rotor to connect the pair of retainer parts and pad resilient parts that urge the friction pads outward in the radial direction of the disk, wherein: the retainer parts include inner side pieces arranged along the inner side surfaces of the pad guide grooves in the radial direction of the disk, outer side pieces arranged along the outer side surfaces of the pad guide grooves in the radial direction of the disk and interior pieces that connect the outer side pieces to the inner side pieces in interior parts of the pad guide grooves and are arranged along the opposed surfaces; and the outer side pieces include impact suppressing parts that restrain the lug pieces from colliding with the outer side surfaces in the radial direction of the disk through the outer side pieces.

The impact suppressing parts may be stepped parts formed by bending the outer side pieces. The caliper support arms may include pad retainer attaching parts having attaching surfaces parallel to the outer side surfaces in the radial direction of the disk in outer sides of the pad guide grooves in the radial direction of the disk, end parts of groove opening side parts of the outer side pieces may be bent back along the attaching surfaces of the pad retainer attaching parts to form attaching pieces, and the pad retainer attaching parts may be sandwiched between the attaching pieces and the outer side pieces to attach the pad retainer to the caliper support arms.

In the impact suppressing parts, the outer side pieces may be bent in stepped forms so that groove interior parts of the outer side pieces are arranged more outside in the radial direction of the disk than groove opening side parts to form stepped parts, and the pad retainer may be attached to the caliper support arms in such a way that the pad retainer attaching parts are held at three positions including groove interior side abutting parts and groove opening side abutting parts of the outer side pieces abutting on the outer side surfaces in the radial direction of the disk and attaching piece side abutting parts of the attaching pieces abutting on the attaching surfaces between the groove interior side abutting parts and the groove opening side abutting parts in the circumferential direction of the disk.

The interior pieces may be connected to the outer side pieces at acute angles α thereto. The pad resilient parts may be formed by gradually inclining the end parts of elongated pieces extended to the disk rotor through elastic loop parts that are extended from the sides of the inner side pieces opposite to the disk rotor and bent outward in circular arc forms in the radial direction of the disk, outward in the radial direction of the disk, and the lug pieces may be urged outward in the radial direction of the disk and urged toward the direction opposite to the disk rotor by the elongated pieces.

According to the disk brake for a vehicle of the present invention, since the lug pieces of the friction pad are urged outside in the radial direction of the disk by the pad resilient parts of the pad retainer, even when the vibration occurs during an ordinary driving, the friction pad is held at a prescribed position in a stable condition. Further, even when the vibration larger than an ordinary vibration is applied to a vehicle body, for instance, when the vehicle gets over a stepped part during the driving, the friction pad temporarily moves inside in the radial direction of the disk against the urging force of the pad resilient parts, then, is urged outside in the radial direction of the disk by the urging force of the pad resilient parts and the lug pieces are apt to collide with the outer side surfaces of the pad guide grooves in the radial direction of the disk through the outer side pieces of the pad retainer, since the outer side pieces are provided with the impact suppressing parts for suppressing the collision of the lug pieces with the outer side surfaces in the radial direction of the disk through the outer side pieces, the force of the lug pieces in the direction of collision is absorbed by the impact suppressing parts and the generation of cronk noise can be prevented.

Further, when the impact suppressing parts are formed by stepped parts which are formed by bending the outer side pieces, the impact suppressing parts can be formed by a simple method that the outer side pieces are merely bent, and the force of the lug pieces in the direction of collision can be effectively absorbed by spaces formed between the outer side pieces and the outer side surfaces of the pad guide grooves in the radial direction of the disk.

Further, in the outer sides of the pad guide grooves of the caliper support arms in the radial direction of the disk, the pad retainer attaching parts are provided that have the attaching surfaces parallel to the outer side surfaces in the radial direction of the disk. The pad retainer is attached to the caliper support arms in such a way that the end parts of the groove opening side parts of the outer side pieces are bent back along the attaching surfaces of the pad retainer attaching parts to form the attaching pieces and the pad retainer attaching parts are sandwiched between the attaching pieces and the outer side pieces to attach the pad retainer to the caliper support arms. Thus, the pad retainer can be simply and assuredly attached to a prescribed position.

Further, in the impact suppressing parts, the outer side pieces are bent in stepped forms so that the groove interior parts of the outer side pieces are arranged more outside in the radial direction of the disk than the groove opening side parts to form the stepped parts. The pad retainer is attached to the caliper support arms in such a way that the pad retainer attaching parts are held at three positions including the groove interior side abutting parts and the groove opening side abutting parts of the outer side pieces abutting on the outer side surfaces in the radial direction of the disk and the attaching piece side abutting parts of the attaching pieces abutting on the attaching surfaces between the groove interior side abutting parts and the groove opening side abutting parts in the circumferential direction of the disk. Thus, the inner sides of the interior pieces in the radial direction of the disk are attached to be inclined toward the central parts of the friction pads. Accordingly, the lug pieces can be urged toward the opposed pad guide grooves by the interior pieces. Even when the force moving in the circumferential direction of the disk is applied to the friction pads, for instance, when the forward movement of the vehicle is changed to the backward movement, the lug pieces can be restrained from colliding with the opposed surfaces of the pad guide grooves through the interior pieces and the generation of the cronk noise can be prevented. Further, since the interior pieces are connected to the outer side pieces at acute angles, an urging force that urges the lug pieces toward the pad guide grooves can be increased.

Further, since the pad resilient parts are formed by gradually inclining the end parts of the elongated pieces extended to the disk rotor through the elastic loop parts from the sides of the inner side pieces opposite to the disk rotor outward in the radial direction of the disk, the lug pieces can be urged outward in the radial direction of the disk, and the lug pieces can be urged toward the direction opposite to the disk rotor. The friction pads can be held at prescribed positions in a stable way by a simple structure and the friction pads after the braking operation can be assuredly pulled back.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

FIGS. 1 to 7 are diagrams showing a first exemplary embodiment of a disk brake for a vehicle of the present invention. An arrow mark A designates a rotating direction of a disk rotor that rotates integrally with a front wheel when a vehicle moves forward. A disk come-out side and a disk come-in side which are described below indicate sides when the vehicle moves forward.

The disk brake 1 for the vehicle includes a disk rotor 2 rotating integrally with a wheel, a caliper bracket 3 fixed to a vehicle body at one side part of the disk rotor 2, a calipers body 5 supported on caliper support arms 3*a* and 3*a* so as to be movable in the axial direction of a disk through a pair of slide pins 4 and 4 and a pair of friction pads 6 and 6 opposed to each other with the disk rotor 2 sandwiched between them inside an action part 5*a* and a reaction part 5*b* of the caliper body 5.

Figure 2:
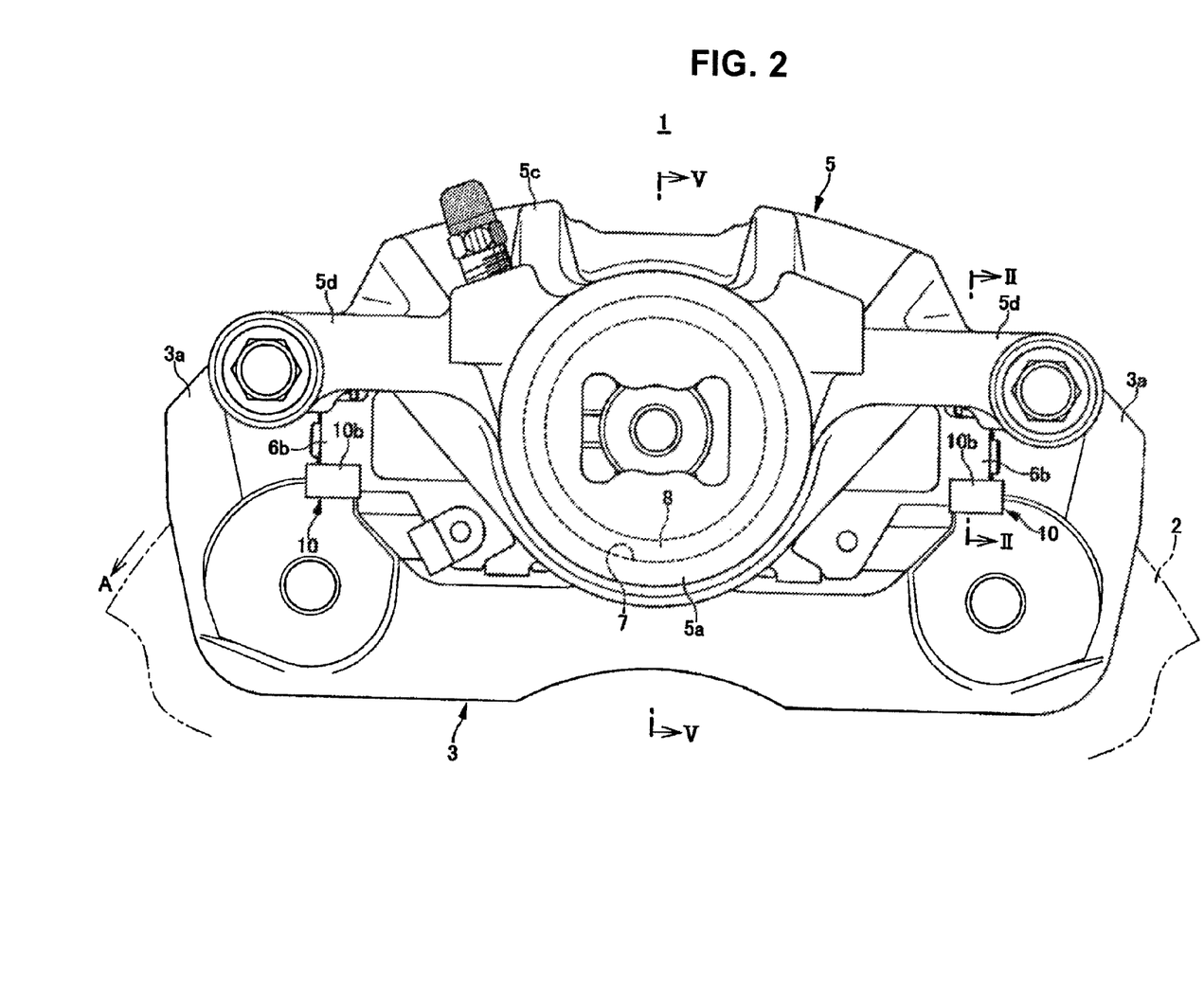
FIG. 2 is a front view of the disk brake in the first exemplary embodiment.
Figure 3:
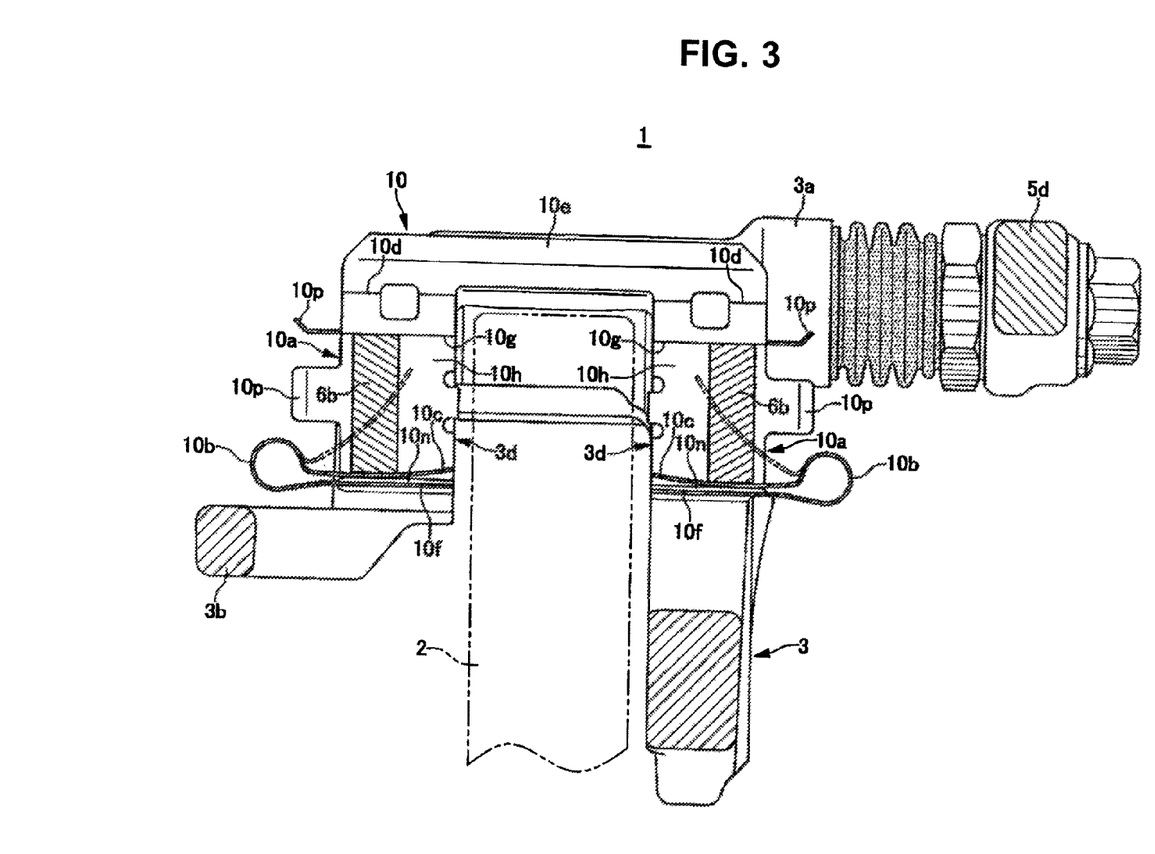
FIG. 3 is a sectional view taken along a line II-II in FIG. 2.

The caliper body 5 includes the above-described action part 5*a* and the reaction part 5*b* arranged at both the sides of the disk rotor 2 and a bridge part 5*c* that strides over an outer edge of the disk rotor 2 to connect the action part 5*a* to the reaction part 5*b*. In the action part 5*a*, a cylinder hole 7 opened to the disk rotor 2 side is provided. In the cylinder hole 7, a cylindrical piston 8 with a bottom is accommodated. The piston 8 moves toward the disk rotor in the cylinder hole 7 by pressure liquid supplied to a hydraulic chamber 9 in a bottom part of the cylinder hole 7. Further, in the side parts of the action part 5*a*, vehicle body attaching arms 5*d* and 5*d* protrude. At the ends of the vehicle body attaching arms 5*d* respectively, the above-described slide pins 4 respectively protrude through attaching bolts.

The caliper support arms 3a and 3a sandwich both the sides of the bridge part 5c from both the side parts of the caliper bracket 3 and stride over the outer edge of the disk rotor 2 in the axial direction of the disk and further extend toward a central part of the disk along the side wall of the reaction part 5b in the other end part of the disk rotor 2. End parts of the caliper support arms 3a and 3a are connected together by a tie rod 3b to improve the rigidity of both the support arms 3a and 3a to which a braking torque is applied.

Figure 1:
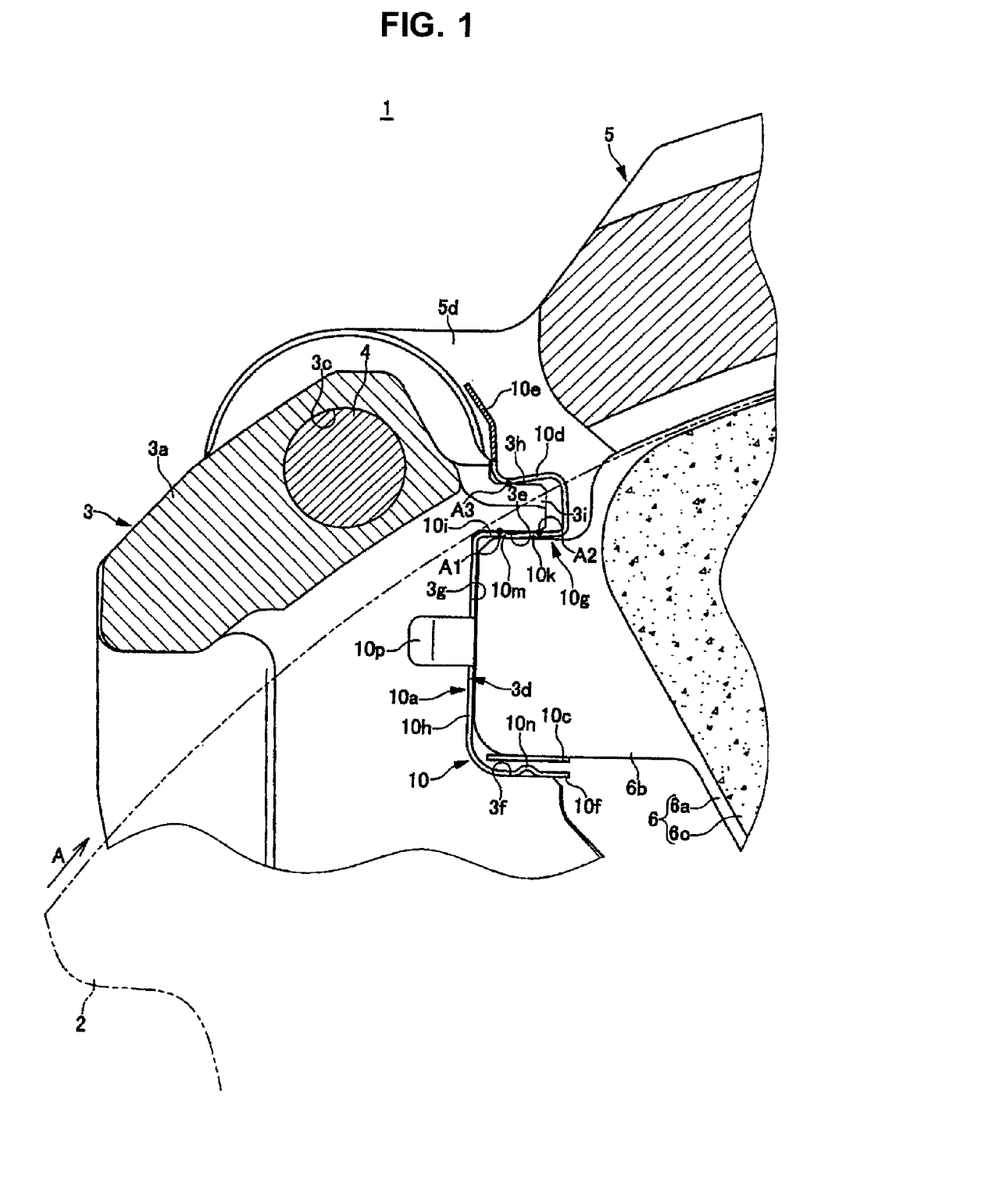
FIG. 1 is an enlarged sectional view of main parts of a disk brake according to a first exemplary embodiment of the present invention.

In the caliper support arms 3a and 3a respectively, guide holes 3c are formed for accommodating the slide pins 4. Further, in both the caliper support arms 3a and 3a, four pad guide grooves 3d are provided that face each other respectively in the side parts of the disk rotor 2. The pad guide grooves 3d are respectively formed in U shapes having outer side surfaces 3e in the radial direction of the disk, inner side surfaces 3f in the radial direction of the disk and opposed surfaces 3g that connect both the side surfaces 3e and 3f. Each of the friction pad 6 has lug pieces 6b and 6b respectively protruding at both side parts of a back plate 6a which are respectively supported by the pad guide grooves 3d and 3d in the disk come-in side and the disk come-out side through a pad retainer 10. In outer sides of the pad guide grooves 3d and 3d in the radial direction of the disk, pad retainer attaching parts 3i and 3i are respectively provided which have attaching surfaces 3h parallel to the outer side surfaces 3e in the radial direction of the disk.

Figure 4:
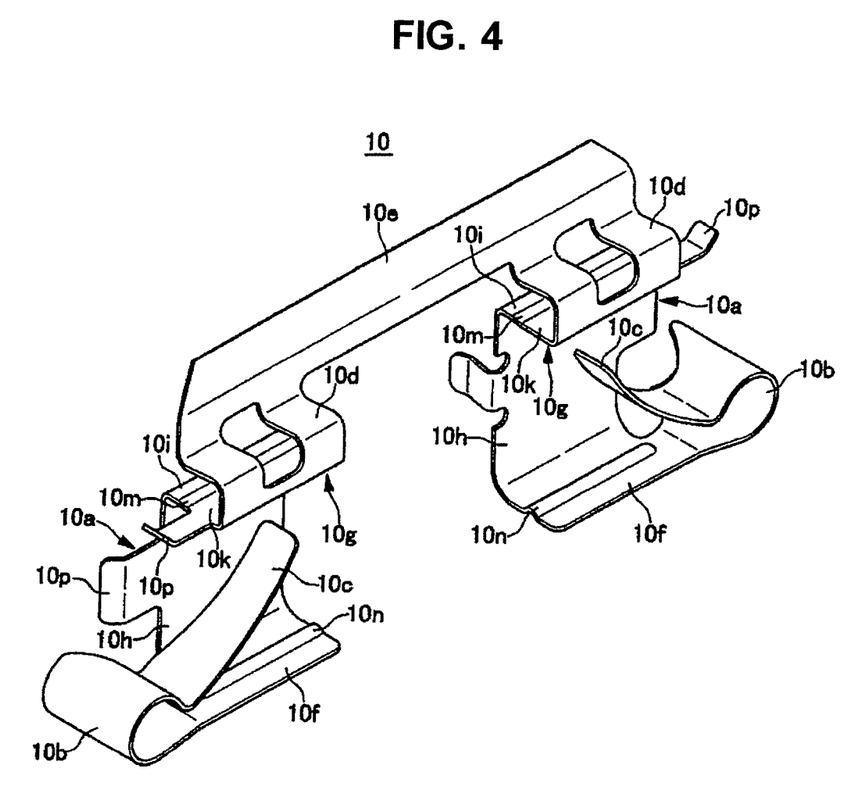
FIG. 4 is a perspective view of a pad retainer in the first exemplary embodiment.
Figure 5:
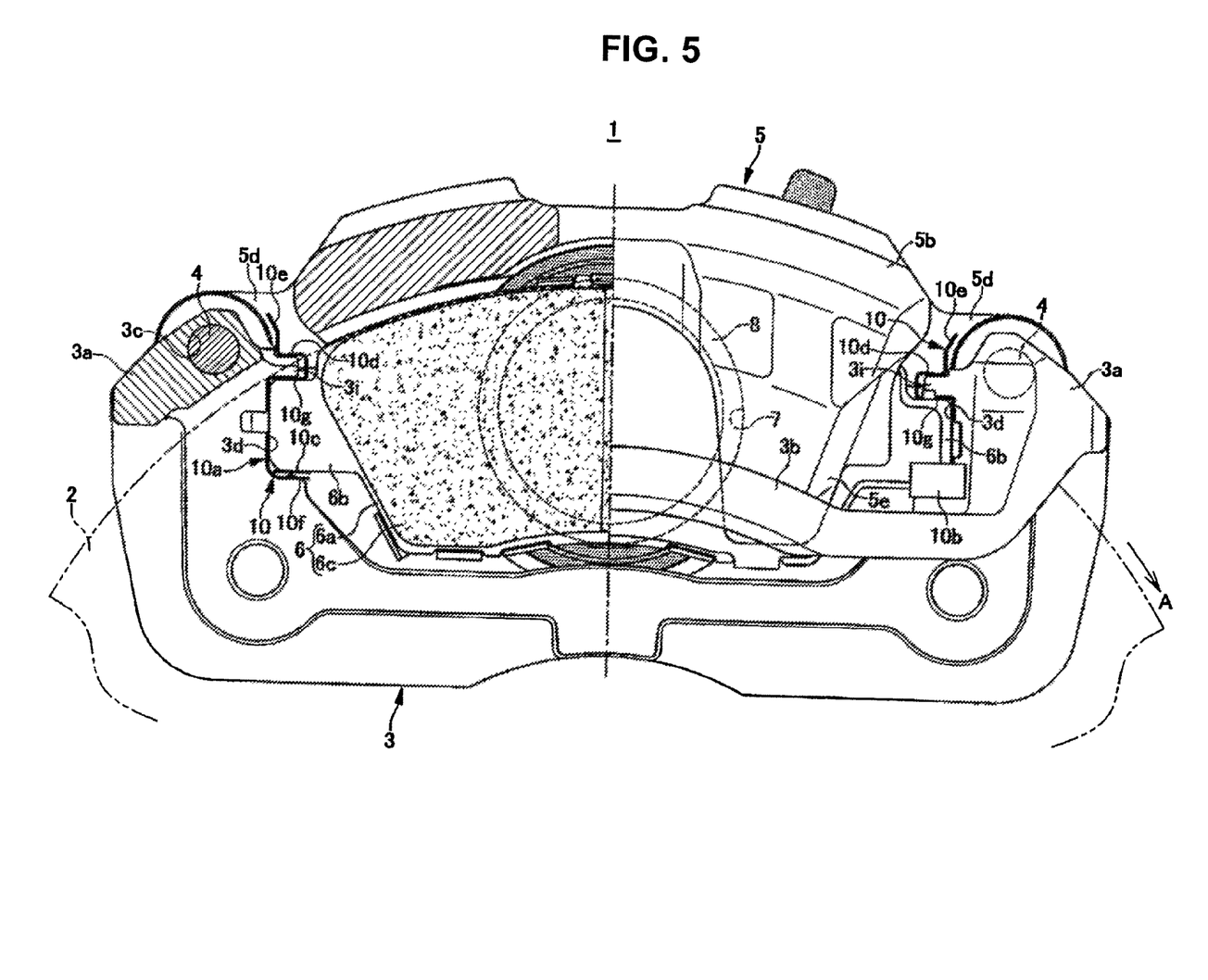
FIG. 5 is a partly sectional rear view of the disk brake in the first exemplary embodiment.
Figure 6:
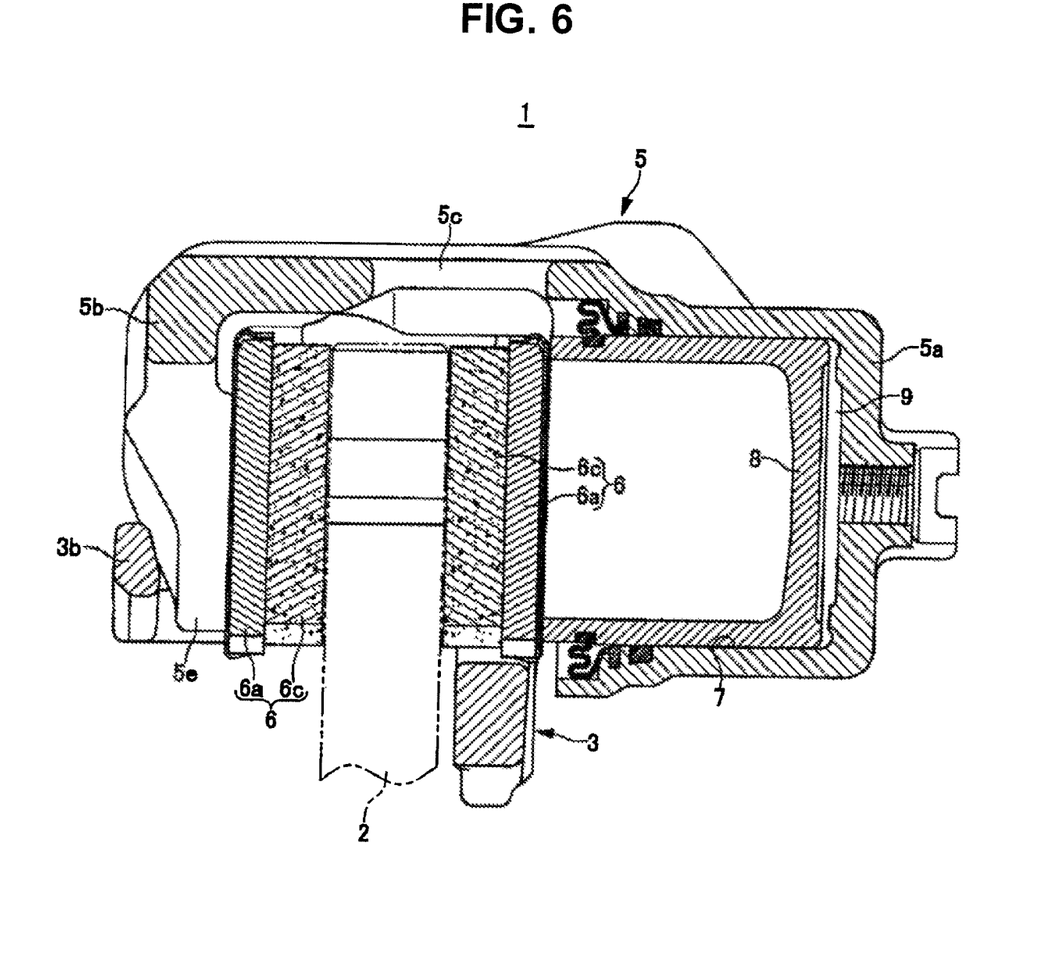
FIG. 6 is a sectional view taken along a line V-V in FIG. 2.

The above-described pad retainer 10 includes a pair of retainer parts 10a and 10a attached to the pad guide grooves 3d and 3d in both the sides of the disk rotor in the disk come-in side or the disk come-out side, pad resilient parts 10c and 10c extending to the disk rotor side through elastic loop parts 10b and 10b provided in the disk rotor side opposite to that of the retainer parts 10a and 10, attaching pieces 10d and 10d abutting on the attaching surfaces 3h of the pad retainer attaching parts 3i and 3i of the caliper support arms 3a and a connecting piece 10e striding over the outer edge of the disk rotor 2 to connect the upper parts of the attaching pieces 10d and 10d. The retainer parts 10a respectively include inner side pieces 10f and outer side pieces 10g that face inside and outside in the radial direction of the disk with the lug pieces 6b of the friction pad 6 sandwiched between them and interior pieces 10h that connect both the pieces 10f and 10g in interior parts of the pad guide grooves 3d and 3d. The outer side pieces 10g are connected to the interior pieces 10h at right angles thereto.

Figure 7:
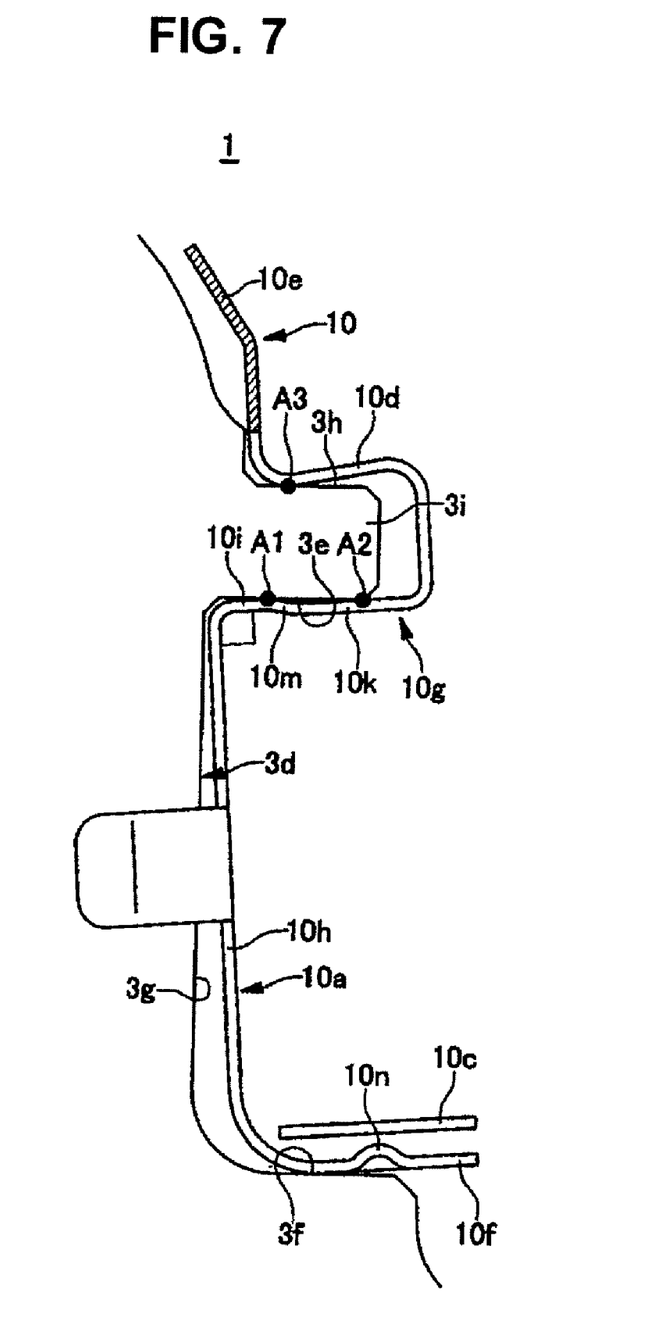
FIG. 7 is an explanatory view showing a state that the pad retainer is attached to a pad guide groove in the first exemplary embodiment.

The outer side pieces 10g are respectively bent in stepped forms so that groove interior parts 10i of the outer side pieces 10g are arranged more outside in the radial direction of the disk than groove opening side parts 10k to form stepped parts 10m (impact suppressing parts of the present invention). Further, end parts of the groove opening side parts 10k of the outer side pieces 10g are bent back along the end surfaces of the pad retainer attaching parts 3i to be extended toward outer side surfaces of the pad retainer attaching parts 3i in the radial direction of the disk so that the attaching pieces 10d may be elastically deformed. Thus, the pad retainer attaching parts 3i are sandwiched between the attaching pieces 10d that are elastically deformed outward and the outer side pieces 10g.

The elastic loop parts 10b are formed by bending back elongated pieces extended from the inner side pieces 10f toward an opposite direction to the disk rotor in circular arc forms toward the disk rotor from outer sides in the radial direction of the disk. The pad resilient parts 10c are located in the end sides of the elongated pieces extended toward the disk rotor from the bent back ends of the elastic loop parts 10b. The pad resilient parts 10c have a length sufficiently corresponding to a distance that the lug pieces 6b of the friction pad 6 move until a lining is completely worn from the first time when the lining is new. The pad resilient parts 10c are formed to be gradually inclined outward in the radial direction of the disk and bent back in curved forms along extended directions thereof.

In the inner side pieces 10f, ribs 10n protruding outward in the radial direction of the disk are respectively formed so as to support the pad resilient parts 10c. The ribs 10n are provided in the directions parallel to the axis of the disk and formed to have the same height of protrusion over an entire length. Further, in the sides of the outer side pieces 10g and 10g and the interior pieces 10h and 10h opposite to the disk rotor, insert guide pieces 10p are respectively provided to be opened outward so that the lug pieces 6b of the friction pad 6 may be easily inserted.

The pad retainer 10 formed as described above is attached to the caliper support arms 3a by inserting the attaching pieces 10d and the outer side pieces 10g to the pad retainer attaching parts 3i. In the attachment, the pad retainer 10 is attached to the caliper support arms 3a under a state that the inner side pieces 10f and the outer side pieces 10g of the retainer parts 10a respectively abut on the inner side surfaces 3f in the radial direction of the disk and the outer side surfaces 3e in the radial direction of the disk of the pad guide grooves 3d respectively. Further, the elastic loop parts 10b are respectively arranged in the sides of the caliper arms 3a opposite to the disk rotor and the pad resilient parts 10c are respectively arranged so that the pad resilient parts 10c are gradually curved and inclined toward the outer side surfaces 3e of the pad guide grooves 3d in the radial direction of the disk toward the disk rotor from the elastic loop parts 10b.

Further, since spaces are formed between the groove opening side parts 10k of the outer side pieces 10g and the outer side surfaces 3e of the pad guide grooves 3d in the radial direction of the disk by the stepped parts 10m formed in the outer side pieces 10g, as shown in FIG. 7, a force directed outward in the radial direction of the disk is applied to the groove opening side parts 10k of the outer side pieces 10g by the elastic restoring force of the attaching pieces 10d. Thus, the pad retainer attaching parts 3i are held at three positions including groove interior side abutting parts A1 of the groove interior parts 10i abutting on the outer side surfaces 3e in the radial direction of the disk, groove opening side abutting parts A2 of the groove opening side parts 10k and attaching piece side abutting parts A3 of the attaching pieces 10d abutting on the attaching surfaces 3h between the groove interior side abutting parts A1 and the groove opening side abutting parts A2 in the circumferential direction of the disk. This force acts on the interior pieces 10h so that the inner sides of the interior pieces 10h in the radial direction of the disk are inclined toward the central parts of the friction pad 6.

The friction pads 6 are respectively attached by inserting the lug pieces 6b and 6b of the back plates 6a into the pad guide grooves 3d and 3d in the disk come-in side and the disk come-out side, allowing the outer side surfaces of the lug pieces 6b and 6b in the radial direction of the disk to abut on the outer side pieces 10g and 10g of the retainer parts 10a and 10a, allowing the inner side surfaces of the lug pieces 6b and 6b to abut on the pad resilient parts 10c. Thus, in the inner side pieces 10f and 10f and the pad resilient parts 10c and 10c, slight spaces are formed between the ribs 10n and 10n and the pad resilient parts 10c and 10c, or the ribs 10n and 10n abut on the pad resilient parts 10c and 10c. Further, by the above-described attachment, the elastic loop parts 10b and 10b are arranged in the sides of the lug pieces 6b and 6b opposite to the disk rotor to prevent the friction pads 6 from slipping out. Further, the interior pieces 10h and 10h arranged under a state that the inner sides of the interior pieces 10h and 10h in the radial direction of the disk are inclined toward the central parts of the friction pads 6 are pressed by the lug pieces 6b and 6b to be elastically deformed toward the opposed surfaces 3g.

The present exemplary embodiment is formed as described above. When working fluid whose pressure is raised is supplied to the hydraulic chamber 9 by a braking operation of a driver, the piston 8 moves forward in the cylinder hole 7 to press the friction pad 6 in the action part 5a to one side surface of the disk rotor 2 rotating in the direction shown by the arrow mark A. Then, the caliper body 5 is guided by the slide pins 4 and 4 to move to the action part 5a by a reaction force. A reaction pawl 5e presses the friction pad 6 in the reaction part 5b side to the other side surface of the disk rotor.

At this time, the lug pieces 6b and 6b of the friction pads 6 are respectively smoothly moved in the pad guide grooves 3d and 3d in such a way that the outer side surfaces of the lug pieces 6b and 6b in the radial direction of the disk are respectively guided by the outer side pieces 10g and 10g of the retainer parts 10a and 10a and the inner side surfaces of the lug pieces 6b and 6b in the radial direction of the disk press the pad resilient parts 10c and 10c to the inner side pieces 10f and 10f. Though the pad resilient parts 10c and 10c are pressed to the inner side pieces 10f and 10f by the lug pieces 6b and 6b, the resilient force of the elastic loop parts 10b and 10b and the pad resilient parts 10c and 10c press the inner side surfaces of the lug pieces 6b and 6b toward the outer side surfaces 3e and 3e of the pad guide grooves 3d and 3d in the radial direction of the disk.

Thus, since the outer side surfaces of the lug pieces 6b and 6b in the radial direction of the disk are constantly pressed to the outer side surfaces 3e and 3e of the pad guide grooves 3d and 3d in the radial direction of the disk through the outer side pieces 10g and 10g, the lug pieces 6b and 6b do not rattle in the pad guide grooves 3d and 3d during the braking operation. Accordingly, the striking noise of the friction pads due to the rattle can be suppressed and brake noise can be effectively suppressed.

Further, when a vibration larger than an ordinary vibration is applied to a vehicle body, for instance, when the vehicle gets over a stepped part during the driving, since the friction pads 6 respectively temporarily move inside in the radial direction of the disk against the urging force of the pad resilient parts 10c and 10c, and then, are urged outside in the radial direction of the disk by the urging force of the pad resilient parts 10c and 10c, the lug pieces 6b and 6b are apt to collide with the outer side surfaces 3e and 3e of the pad guide grooves 3d and 3d in the radial direction of the disk through the outer side pieces 10g and 10g of the pad retainer 10. However, since the spaces are formed between the groove interior side abutting parts A1 and the groove opening side abutting parts A2 by the stepped parts 10m formed in the outer side pieces 10g, the outer side pieces 10g can be elastically deformed to absorb the force of the lug pieces 6b and 6b in the direction of collision and prevent the generation of cronk noise.

Further, since the ribs 10n and 10n that support the pad resilient parts 10c and 10c are formed in the inner side pieces 10f and 10f, smaller spaces can be formed than a case that the spaces between the ribs 10n and 10n and the pad resilient parts 10c and 10c are eliminated or the ribs 10n and 10n are not provided. Accordingly, the friction pads 6 are respectively hardly vibrated in the radial direction of the disk and the cronk noise can be prevented from occurring. Further, when there is a smaller space than that of the above-described case between the ribs 10n and 10n and the pad resilient parts 10c and 10c, even if the friction pads 6 respectively move inside in the radial direction of the disk brake due to the vibration, the inner side pieces 10f and 10f do not abut on the pad resilient parts 10c and 10c. Thus, an impact is damped that the lug pieces 6b and 6b collide with the inner side surfaces 3f and 3f of the pad guide grooves 3d and 3d in the radial direction of the disk through the inner side pieces 10f and 10f and the pad resilient parts 10c and 10c and the generation of the cronk noise can be suppressed.

Further, since the ribs 10n are provided in the directions parallel to the axis of the disk and formed to have the same height of protrusion over the entire length, even if the linings 6c of the friction pads 6 are respectively worn so that the positions of the friction pads 6 are moved to the disk rotor side, a state can be maintained that only smaller spaces are formed than the case in which the spaces between the ribs 10n and 10n and the pad resilient parts 10c and 10c are eliminated or the ribs 10n and 10n are not provided. Accordingly, even when the lining 6c are worn, the generation of the cronk noise can be suppressed.

Further, the lug pieces 6b and 6b are urged toward the opposed pad guide grooves 3d and 3d by the interior pieces 10h and 10h of the pad retainer 10 which are arranged under a state that the inner sides of the interior pieces 10h and 10h in the radial direction of the disk are inclined toward the central parts of the friction pads 6 and are elastically deformed by the lug pieces 6b and 6b. Even when a force moving in the circumferential direction of the disk is applied to the friction pads 6 respectively, for instance, when a forward movement of the vehicle is changed to a backward movement, the lug pieces 6b and 6b can be restrained from colliding with the opposed surfaces 3g and 3g of the pad guide grooves 3d and 3d through the interior pieces 10h and n 10h and the generation of the crank noise can be prevented. In such a way, even when the vibration larger than the ordinary vibration is generated in the vehicle body, the force of the lug pieces 6b in the direction of collision can be absorbed by the pad retainer 10 and the generation of the cronk noise can be suppressed. Especially, since the generation of the cronk noise can be suppressed only by a simple structure that the stepped parts 10m are merely provided in the outer side pieces 10g and 10g and the ribs 10n and 10n are merely provided in the inner side pieces 10f and 10f, there is no fear that the cost is increased.

When the above-described braking operation is cancelled to move the piston 8 and the reaction pawl 5e backward to positions before the braking operation is started, since the elastic loops 10b and 10b and the pad resilient parts 10c and 10c are apt to return to initial forms, the lug pieces 6b and 6b abutting on the pad resilient parts 10c and 10c are respectively pressed toward the sides opposite to the disk rotor and forcedly separated from the side surfaces of the disk rotor 2. Thus, the friction pads 6 can be respectively prevented from being dragged, judder arising due to the abrasion of the disk rotor 2 can be suppressed or brake noise can be effectively suppressed.

Further, when the linings 6c of the friction pads 6 are worn, since the friction pads 6 gradually move forward to the disk rotor 2 side and the lug pieces 6b and 6b abut on the end sides of the pad resilient parts 10c and 10c, a resilient force from the elastic loop parts 10b and 10b is lowered. However, since the pad resilient parts 10c and 10c are curved and bent back along the extending directions, the lowered resilient force can be compensated for. Irrespective of the worn state of the linings 6c, the friction pads 6c can be assuredly separated from the side surfaces of the disk rotor 2 and the backlash of the friction pads can be suppressed.

Further, the friction pads 6 are temporarily attached to the caliper support arms 3a and 3a of the caliper bracket 3, the elastic loop parts 10b and 10b are arranged in the sides of the lug pieces 6b and 6b opposite to the disk rotor. Thus, even when the lug pieces 6b and 6b are pressed to the side opposite to the disk rotor by the pad resilient parts 10c and 10c, since the elastic loop parts 10b and 10b abut on the sides of the lug pieces 6b and 6b opposite to the disk, the friction pads 6 can be prevented from slipping out from the caliper bracket 3 and the attaching performance of the friction pads 6 can be improved.

Figure 8:
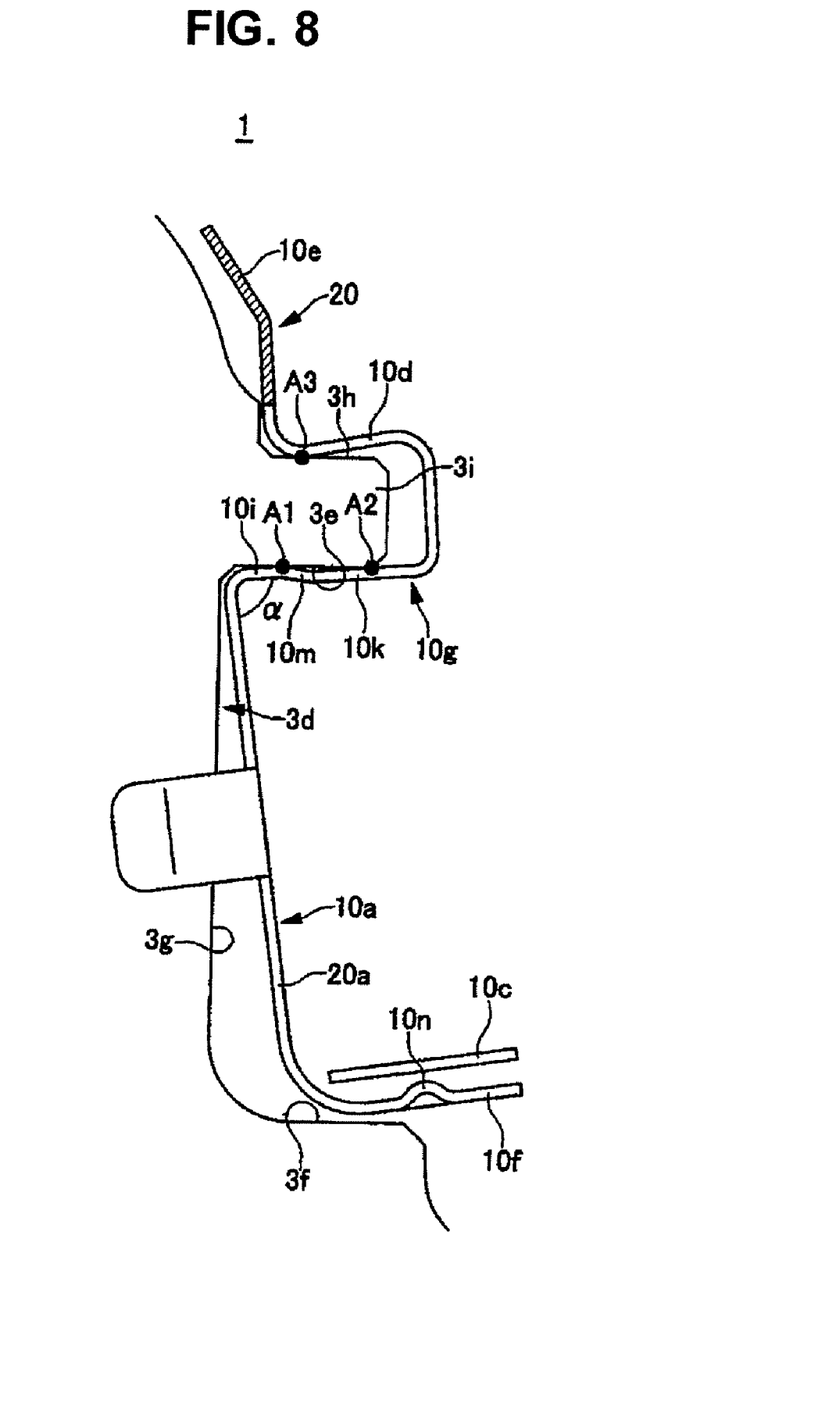
FIG. 8 is an explanatory view showing a state that a pad retainer is attached to a pad guide groove in a second exemplary embodiment of the present invention.
Figure 9:
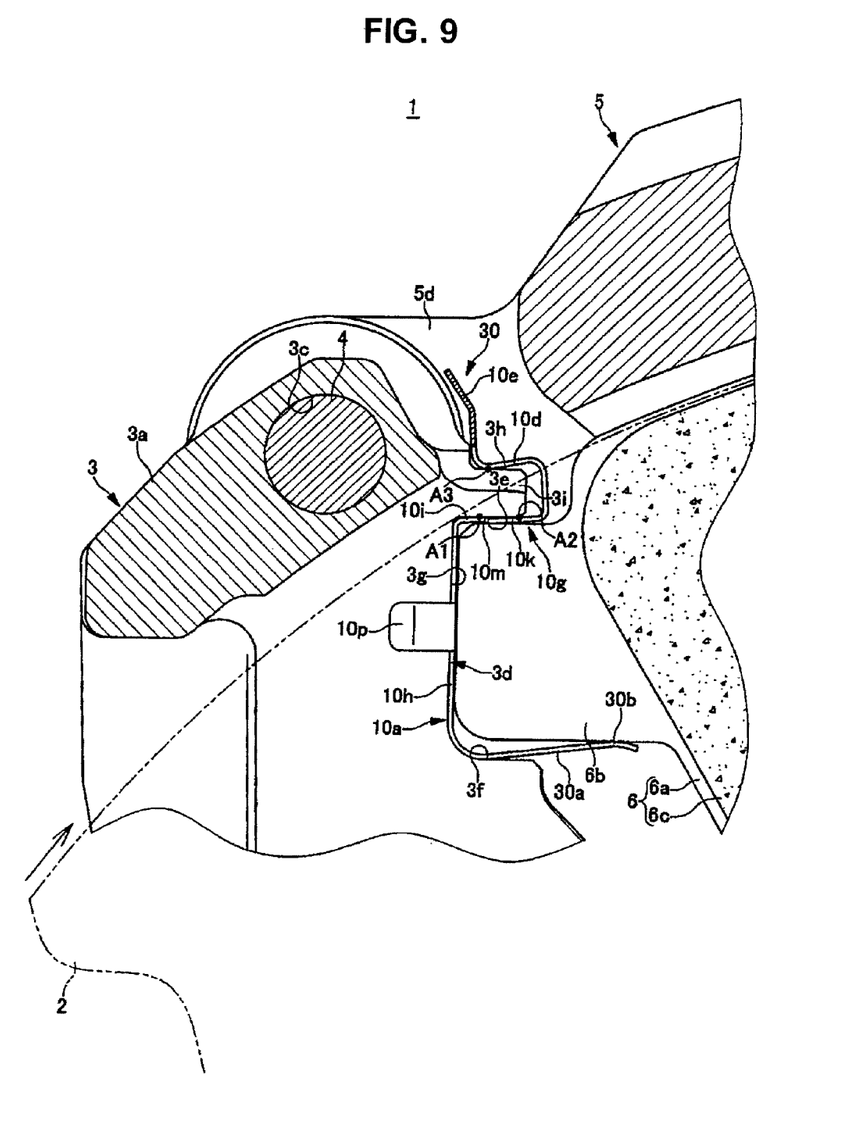
FIG. 9 is an enlarged sectional view of main parts of a disk brake according to a third exemplary embodiment of the present invention.
Figure 10:
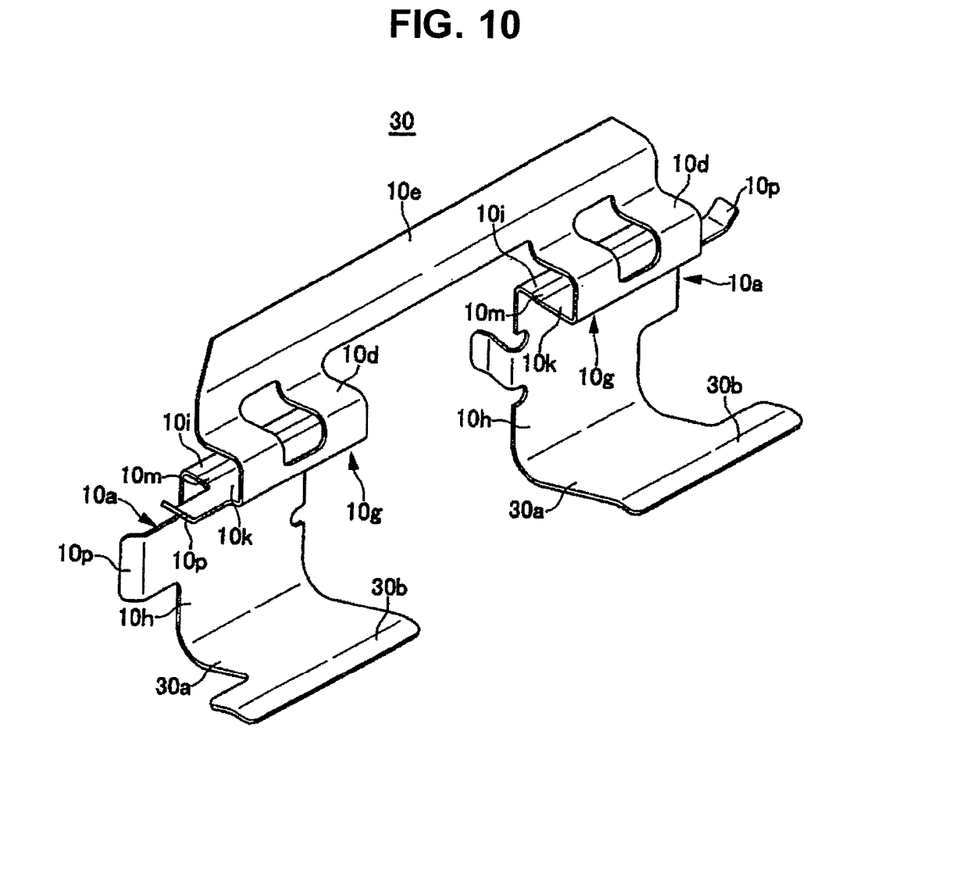
FIG. 10 is a perspective view of a pad retainer in the third exemplary embodiment.

FIGS. 8 to 10 show other exemplary embodiments of the present invention. The same components as those of the first exemplary embodiment are designated by the same reference numerals and a detailed explanation thereof is omitted.

FIG. 8 shows a second exemplary embodiment of the present invention. Retainer parts 10a of a pad retainer 20 of this exemplary embodiment respectively include inner side pieces 10f and outer side pieces 10g that face inside and outside in the radial direction of a disk with lug pieces 6b of friction pads 6 sandwiched between them and interior pieces 20a that connect both the pieces 10f and 10g in interior parts of pad guide grooves 3d and 3d. The interior pieces 20a are connected to the outer side pieces 10g at acute angles α thereto.

When the pad retainer 20 is attached to caliper support arms 3a by inserting attaching pieces 10d and the outer side pieces 10g to pad retainer attaching parts 3i, as in the first exemplary embodiment, a force directed outward in the radial direction of the disk is applied to groove opening side parts 10k of the outer side pieces 10g by the elastic restoring force of the attaching pieces 10d. Thus, the pad retainer attaching parts 3i are held at three positions including groove interior side abutting parts A1 of groove interior parts 10i abutting on outer side surfaces 3e in the radial direction of the disk, groove opening side abutting parts A2 of the groove opening side parts 10k and attaching piece side abutting parts A3 of the attaching pieces 10d abutting on attaching surfaces 3h between the groove interior side abutting parts A1 and the groove opening side abutting parts A2 in the circumferential direction of the disk. Since this force acts on the interior pieces 20a and the interior pieces 20a are connected to the outer side pieces 10g at the acute angles α thereto, the inner sides of the interior pieces 20a in the radial direction of the disk are greatly inclined toward the central parts of the friction pads 6. Thus, an urging force can be increased that urges the lug pieces 6b and 6b toward the opposed pad guide grooves.

FIG. 9 and FIG. 10 show a third exemplary embodiment of the present invention. Since a pad retainer 30 of this exemplary embodiment does not have a mechanism for forcedly separating friction pads 6 respectively from side surfaces of a disk rotor 2 when a braking operation is cancelled, inner end sides of inner side pieces 30a extended from inner end parts of interior pieces 10h in the radial direction of a disk are gradually inclined outward in the radial direction of the disk to form pad resilient parts 30b.

The present invention is not limited to an example that the impact suppressing parts are formed with the stepped parts provided in the outer side pieces of the pad retainer as described in the exemplary embodiments, and any of the impact suppressing parts such as ribs or protrusions may be used that can absorb the force of the lug pieces in the direction of collision. Further, the forms of connecting pieces or attaching pieces or the forms of insert guide pieces or the positions where the insert guide pieces are formed are arbitrary. The ribs formed in the inner side pieces may be displaced a plurality of protrusions. Further, the interior pieces may abut on the opposed surfaces of the pad guide grooves. The ribs for supporting the pad resilient parts may not be provided in the inner side pieces.

What is claimed is:

1. A disk brake for a vehicle comprising:
   a caliper bracket fixed to a vehicle body;
   a pair of caliper support arms provided in the caliper bracket that extend and stride over an outer edge of a disk rotor in the axial direction of a disk;
   U shaped pad guide grooves that are provided in the caliper support arms in opposed forms and have outer side surfaces in the radial direction of the disk, inner side surfaces in the radial direction of the disk and opposed surfaces which connect together both the side surfaces; and
   lug pieces that respectively protrude on both side parts of back plates of friction pads arranged with the disk rotor sandwiched between them and are respectively supported by the pad guide grooves through a pad retainer, the pad retainer including a pair of retainer parts attached to the pad guide grooves at both the sides of the disk rotor, a connecting piece that strides over the outer edge of the disk rotor to connect the pair of retainer parts and pad resilient parts that urge the friction pads outward in the radial direction of the disk, wherein:
   the retainer parts include inner side pieces arranged along the inner side surfaces of the pad guide grooves in the radial direction of the disk, outer side pieces arranged along the outer side surfaces of the pad guide grooves in the radial direction of the disk and interior pieces that connect the outer side pieces to the inner side pieces in interior parts of the pad guide grooves and are arranged along the opposed surfaces; and
   the outer side pieces include impact suppressing parts that restrain the lug pieces from colliding with the outer side surfaces in the radial direction of the disk through the outer side pieces.

2. The disk brake according to claim 1, wherein the pad resilient parts extend to a disk rotor side through elastic loop parts provided in a side of the disk opposite to that of retainer parts.

3. The disk brake according to claim 2, wherein the inner side pieces and the outer side pieces face inside and outside in the radial direction of the disk with the lug pieces sandwiched between them and interior pieces that connect both the inner side pieces and the outer side pieces in interior parts of the pad guide grooves.

4. The disk brake according to claim 3, wherein the outer side pieces are bent in stepped forms so that groove interior parts of the outer side pieces are arranged more outside in the radial direction of the disk than groove opening side parts to form the impact suppressing parts.

5. The disk brake according to claim 4, further comprising end parts of the groove opening side parts of the outer side pieces which are bent back along end surfaces of pad retainer attaching parts to be extended toward outer side surfaces of the pad retainer attaching parts in the radial direction of the disk so that the attaching pieces are elastically deformed.

6. The disk brake according to claim 5, wherein:
   the pad retainer is attached to the caliper support arms under a state that the inner side pieces and the outer side pieces abut on inner side surfaces in the radial direction of the disk and outer side surfaces in the radial direction of the disk of the pad guide grooves;
   the elastic loop parts are arranged in the sides of the caliper arms opposite to the disk and the pad resilient parts are arranged so that the pad resilient parts are curved and inclined toward the outer side surfaces of the pad guide grooves in the radial direction of the disk toward the disk rotor from the elastic loop parts;

spaces are formed between the groove opening side parts of the outer side pieces and the outer side surfaces of the pad guide grooves in the radial direction of the disk by the impact suppressing parts formed in the outer side pieces; and a force directed outward in the radial direction of the disk is applied to the groove opening side parts by an elastic restoring force of the attaching pieces such that the pad retainer attaching parts are held at three positions by the pad retainer including two positions on a first side and one position on a second side.

7. The disk brake according to claim 6, wherein:

due to the spaces, the outer side pieces can be elastically deformed to absorb a force of the lug pieces in the direction of collision and prevent generation of cronk noise;

the spaces substantially prevent the friction pads from hardly vibrating in the radial direction of the disk and the cronk noise can be prevented from occurring; and ribs that support the pad resilient parts are formed in the inner side pieces.

8. The disk brake according to claim 5, wherein the pad retainer attaching parts are held at three points by the pad retainer including two points on a first side and one point on a second side.

9. The disk brake according to claim 3, wherein the outer side pieces are connected to the interior pieces at a right angle.

10. The disk brake according to claim 2, wherein:

the elastic loop parts are formed by bending back elongated pieces extended from the inner side pieces toward an opposite direction to the disk rotor in circular arc forms toward the disk from outer sides in the radial direction of the disk;

the pad resilient parts are located in end sides of the elongated pieces extended toward the disk from the bent back ends of the elastic loop parts; and the pad resilient parts have a length corresponding to a distance that the lug pieces move until a lining is completely worn from a time when the lining is new.

11. The disk brake according to claim 10, further comprising ribs formed in the inner side pieces and protruding outward in the radial direction of the disk so as to support the pad resilient parts, wherein the ribs are provided in a direction parallel to an axis of the disk and formed to have a same height of protrusion over an entire length.

12. The disk brake according to claim 11, wherein in sides of the outer side pieces and the interior pieces opposite to the disk, insert guide pieces are provided to be opened outward with respect to the outer side pieces and the interior pieces so that the lug pieces can be inserted.

13. The disk brake according to claim 10, wherein the pad resilient parts are formed to be gradually inclined outward in the radial direction of the disk and bent back in curved forms along extended directions thereof.

14. The disk brake according to claim 1, wherein:

the caliper support arms include pad retainer attaching parts having attaching surfaces parallel to the outer side surfaces in the radial direction of the disk in outer sides of the pad guide grooves in the radial direction of the disk;

end parts of groove opening side parts of the outer side pieces are bent back along the attaching surfaces of the pad retainer attaching parts to form attaching pieces; and the pad retainer attaching parts are sandwiched between the attaching pieces and the outer side pieces to attach the pad retainer to the caliper support arms.

15. The disk brake according to claim 14, wherein:

in the impact suppressing parts, the outer side pieces are bent in stepped forms so that groove interior parts of the outer side pieces are arranged more outside in the radial direction of the disk than groove opening side parts to form stepped parts; and the pad retainer is attached to the caliper support arms in such a way that the pad retainer attaching parts are held at three positions including groove interior side abutting parts and groove opening side abutting parts of the outer side pieces abutting on the outer side surfaces in the radial direction of the disk and attaching piece side abutting parts of the attaching pieces abutting on the attaching surfaces between the groove interior side abutting parts and the groove opening side abutting parts in the circumferential direction of the disk.

16. The disk brake according to claim 1, wherein the impact suppressing parts are stepped parts formed by bending the outer side pieces.

17. The disk brake according to claim 1, wherein the interior pieces are connected to the outer side pieces at acute angles α thereto.

18. The disk brake according to claim 1, wherein the pad resilient parts are formed by gradually inclining the end parts of elongated pieces extended to the disk rotor through elastic loop parts that are extended from the sides of the inner side pieces opposite to the disk rotor and bent outward in circular arc forms in the radial direction of the disk, and the lug pieces are urged outward in the radial direction of the disk and urged toward the direction opposite to the disk rotor by the elongated pieces.

19. The disk brake according to claim 1, further comprising inner end sides of inner side pieces extend from inner end parts of the interior pieces in the radial direction of the disk which are inclined outward in the radial direction of the disk to form pad resilient parts.

20. A disk brake for a vehicle comprising:

pad guide grooves provided in caliper support arms in opposed forms and which have outer side surfaces in a radial direction of a disk, inner side surfaces in the radial direction of the disk and opposed surfaces which connect together the side surfaces;

pad retainer attaching parts comprised of the outer side surfaces of the pad guide grooves and attaching surfaces separated from the outer side surfaces by a wall; and lug pieces that respectively protrude on both side parts of back plates of friction pads supported by the pad guide grooves through a pad retainer, the pad retainer including a pair of retainer parts comprised of:

inner side pieces arranged along inner side surfaces of the pad guide grooves in the radial direction of the disk, outer side pieces arranged along outer side surfaces of the pad guide grooves in the radial direction of the disk, interior pieces that connect the outer side pieces to the inner side pieces in interior parts of the pad guide grooves, and attaching pieces positioned on an opposing side of the outer side surfaces forming a part of the pad retainer attaching parts, the pad retainer attaching parts being held at three points including two points on the outer side surfaces by the outer side pieces and one point on the attaching surfaces by the attaching pieces.

* * * * *